(12) United States Patent
Huyn et al.

(10) Patent No.: US 11,176,700 B2
(45) Date of Patent: Nov. 16, 2021

(54) SYSTEMS AND METHODS FOR A REAL-TIME INTELLIGENT INSPECTION ASSISTANT

(71) Applicant: Hitachi, Ltd., Tokyo (JP)

(72) Inventors: Nam Huyn, Milpitas, CA (US); Ravigopal Vennelakanti, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 175 days.

(21) Appl. No.: 16/515,804

(22) Filed: Jul. 18, 2019

(65) Prior Publication Data

US 2021/0019910 A1   Jan. 21, 2021

(51) Int. Cl.
| | |
|---|---|
| *G06K 9/00* | (2006.01) |
| *H04N 7/18* | (2006.01) |
| *G06T 7/73* | (2017.01) |
| *G06K 9/62* | (2006.01) |
| *G06T 7/55* | (2017.01) |

(52) U.S. Cl.
CPC .............. *G06T 7/74* (2017.01); *G06K 9/6215* (2013.01); *G06T 7/55* (2017.01); *G06T 7/75* (2017.01); *G06T 2207/20081* (2013.01); *G06T 2207/30108* (2013.01)

(58) Field of Classification Search
USPC ....... 382/103, 107, 143, 154–155, 168, 173, 382/181, 190, 199, 209, 219, 232, 254, 382/276, 291, 305, 318; 348/159, 134
See application file for complete search history.

(56) References Cited

U.S. PATENT DOCUMENTS

| | | | | |
|---|---|---|---|---|
| 2019/0149725 | A1* | 5/2019 | Adato | H04N 1/32144 |
| | | | | 348/158 |
| 2019/0277345 | A1* | 9/2019 | Farahati | B32B 37/12 |
| 2020/0166922 | A1* | 5/2020 | Cella | G05B 19/406 |
| 2020/0302510 | A1* | 9/2020 | Chachek | G06K 9/00671 |
| 2021/0042502 | A1* | 2/2021 | Adato | G06K 9/00624 |

* cited by examiner

*Primary Examiner* — Seyed H Azarian
(74) *Attorney, Agent, or Firm* — Procopio, Cory, Hargreaves & Savitch LLP

(57) ABSTRACT

Example implementations described herein are directed to a solution to the problem of accurate real-time inventory counting and industrial inspection. The solution, involves a device such as a mobile device that assists a human operator on the field to quickly achieve high quality inspection results. The example implementations detect objects of interest in individual image snapshots and use location and orientation sensors to integrate the snapshots to reconstruct a more accurate virtual representation of the inspection area. This representation can then be reorganized in various ways to derive inventory counts and other information that are not planned originally.

16 Claims, 10 Drawing Sheets

FIG. 7(a)

SYSTEMS AND METHODS FOR A REAL-TIME INTELLIGENT INSPECTION ASSISTANT

BACKGROUND

Field

The present disclosure is generally directed to an inspection system for inventory, and more specifically, to facilitating a real-time intelligent inspection assistant for industrial environments.

Related Art

In industrial environments, there is a need to periodically conduct inventory counts to determine the amount of inventory available. Such processes are conducted manually by a human who needs to physically count inventory that is distributed within the industrial environment. However, because the inventory count is a manual process, the count may take a long time (e.g., several weeks for counting pipes in an open field), and the count may need to be verified again to determine if the count is accurate.

SUMMARY

There is a need to facilitate accurate real-time inventory counting and industrial inspection in an automated manner. Example implementations described herein utilize features of a mobile device to assist a human operator on the field to quickly achieve higher quality inspection results than manual inspection alone.

Example implementations are directed to systems and methods to facilitate detecting objects in an image in real time, associating an image snapshot with the inspection area, combining multiple image snapshots to reconstruct a virtual world of the inspection area accurately, and reorganizing the virtual world to derive information that may not be planned originally.

Example implementations can involve a front-facing camera that delivers a stream of image frames which are continuously analyzed by an object detector. Objects in an image are detected in real-time and the resulting annotations, such as bounding boxes and object classes, are superimposed onto the image frame to provide an Augmented Reality (AR) visualization of the inspection area. This ability of continuous object detection allows the operator to reframe the camera to obtain the best snapshots and gives the operator the opportunity to edit the annotations on the spot when needed. The finalized annotated image frames can be saved for further processing.

Aspects of the present disclosure involve a non-transitory computer readable medium, storing instructions for executing a process which can include receiving a plurality of image frames, each of the plurality of image frames including a subset of a plurality of objects; identifying each of the subset of the plurality of objects for each of the plurality of image frames; determining translations between the plurality of image frames based on identified objects of the subset of the objects that are identical; and determining the plurality of objects for the translations.

Aspects of the present disclosure involve a method which can include receiving a plurality of image frames, each of the plurality of image frames including a subset of a plurality of objects; identifying each of the subset of the plurality of objects for each of the plurality of image frames; determining translations between the plurality of image frames based on identified objects of the subset of the objects that are identical; and determining the plurality of objects for the translations.

Aspects of the present disclosure involve a system which can include means for receiving a plurality of image frames, each of the plurality of image frames including a subset of a plurality of objects; means for identifying each of the subset of the plurality of objects for each of the plurality of image frames; means for determining translations between the plurality of image frames based on identified objects of the subset of the objects that are identical; and means for determining the plurality of objects for the translations.

Aspects of the present disclosure include a device, which can include a camera; and a processor, configured to receive a plurality of image frames from the camera, each of the plurality of image frames comprising a subset of a plurality of objects; identify each of the subset of the plurality of objects for each of the plurality of image frames; determine translations between the plurality of image frames based on identified objects of the subset of the objects that are identical; and determine the plurality of objects for the translations.

Aspects of the present disclosure involves a non-transitory computer readable medium, storing instructions for executing a process, the instructions involving receiving a plurality of image frames, each of the plurality of image frames comprising a subset of a plurality of objects; identifying each of the subset of the plurality of objects for each of the plurality of image frames; determining translations between the plurality of image frames based on identified objects of the subset of the objects that are identical; and determining the plurality of objects for the translations.

BRIEF DESCRIPTION OF DRAWINGS

FIG. 7(a) illustrates an example of conducting 2D reconstruction involving snapshots that do not follow any specific order, in accordance with an example implementation.

DETAILED DESCRIPTION

Figure 1:
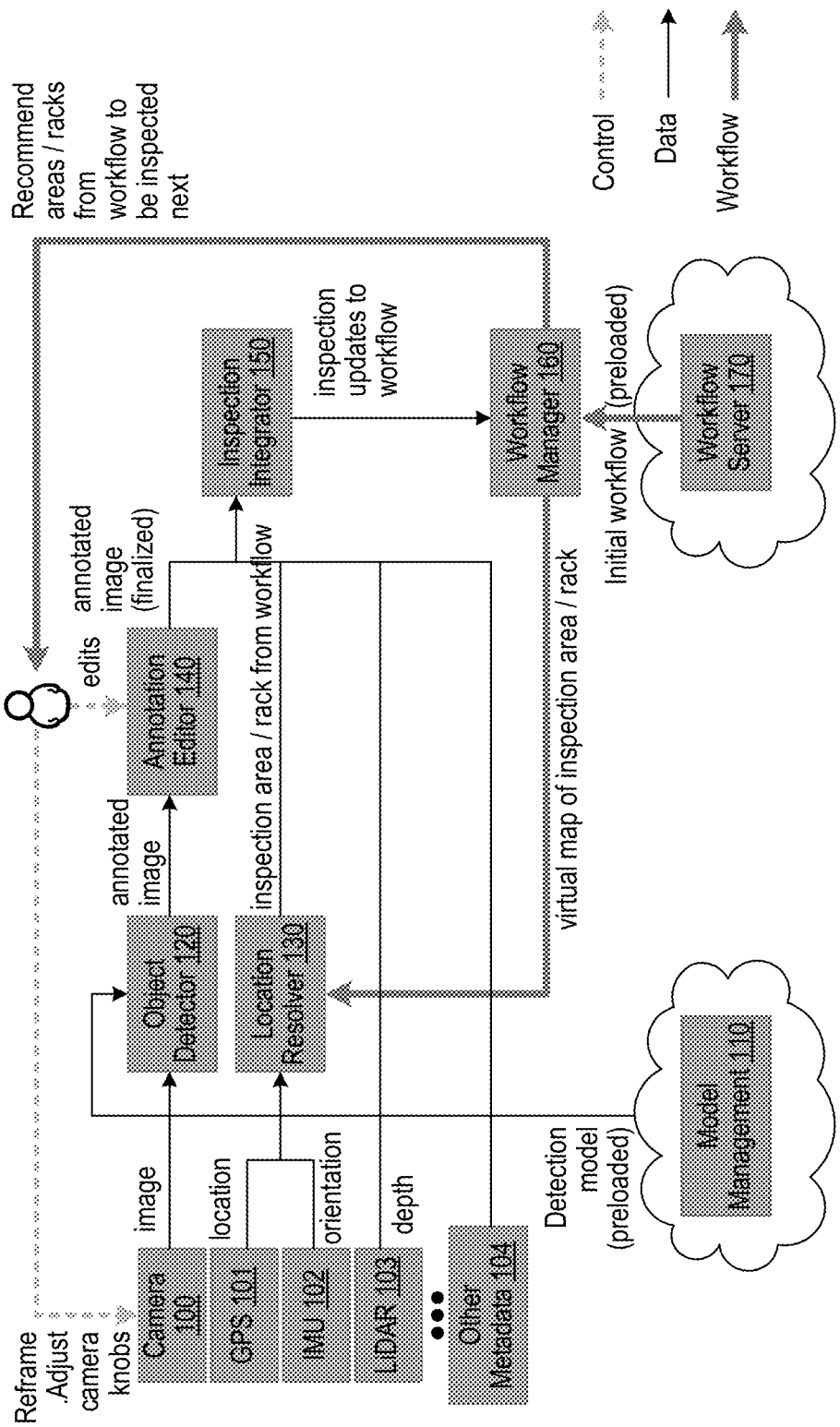
FIG. 1 illustrates a system architecture in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates a system architecture in accordance with an example implementation. In the example of FIG. 1, the object detection pipeline is shown.

Besides the camera 100, the system is also equipped with additional sensors that, when properly integrated, allow the system to be self-aware of its own location and spatial orientation, and to enrich 2D frames with depth information, all of which facilitates a complete and accurate reconstruction of the inspection subject and provides a context of where the inspection task stands with respect to the relevant business workflow.

Figure 4:
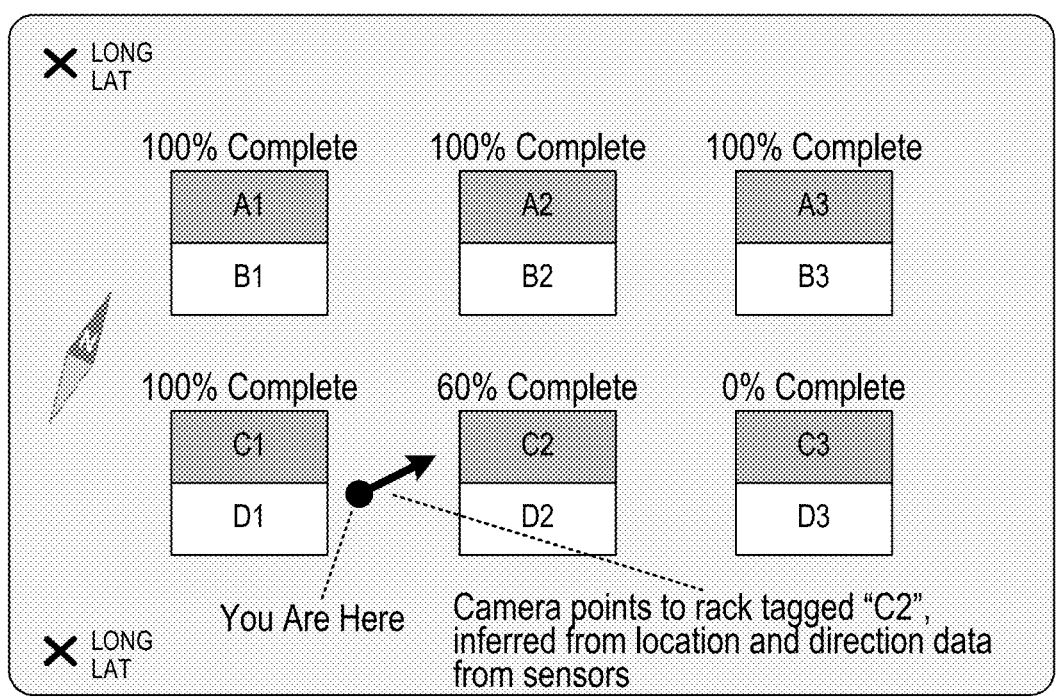
FIG. 4 illustrates an example of a geolocated map of areas to be inspected in a workflow, in accordance with an example implementation.

Global Positioning Satellite (GPS) 101 and Inertial Measurement Unit (IMU) 102 sensors generate location and orientation data indicative of where and how an image is taken. This information, together with workflow map data as will be described herein, helps identify the area/rack subject that is inspected in the image. The sensor data also help merge detections from multiple snapshots taken of the same area/racks from different viewpoints, to reconstruct a high quality 2D virtual representation of the inspection subject and thus achieve a more accurate/robust/complete object detection and counting of inventory. The GPS sensor 101 and the IMU sensor 102 can be processed by a location resolver 130 which can resolve a location on a virtual map as illustrated in FIG. 4.

Depending on the desired implementation, Light Detection and Ranging (LiDAR) sensors 103 provide depth information which, when combined with object detection across multiple frames, can help reconstruct a virtual 3D representation of the inspection subject.

Other metadata 104 available to the system can include calibration data that are specific to the camera and sensors used, or other data in accordance with the desired implementation, such as but not limited to clock data, light sensor data, and so on.

To represent contextual information underlying an inspection task, workflow objects involving a virtual map of the area/racks to be inspected are utilized, which includes the geolocation and identifier (ID) tags that could be used to validate tag detection. A list of areas/racks that need inspection, together with their completion status, is maintained and serves to recommend to the operator where to inspect next through workflow manager 160 as driven by workflow server 170, and as illustrated in FIG. 4. The workflow completes when inspection status of all these areas/racks reach 100%.

Figure 2:
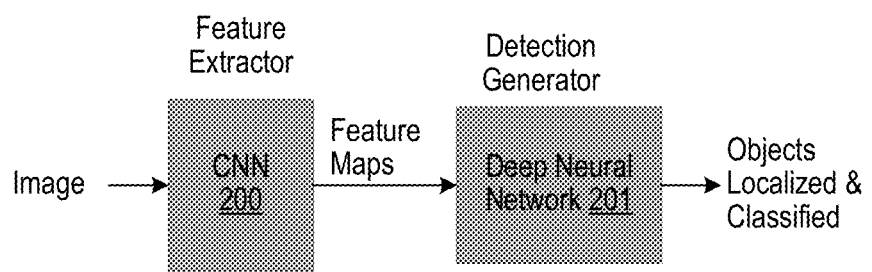
FIG. 2 illustrates a high-level architecture of a Single Shot Detector (SSD) type of object detector, in accordance with an example implementation.
Figure 3:
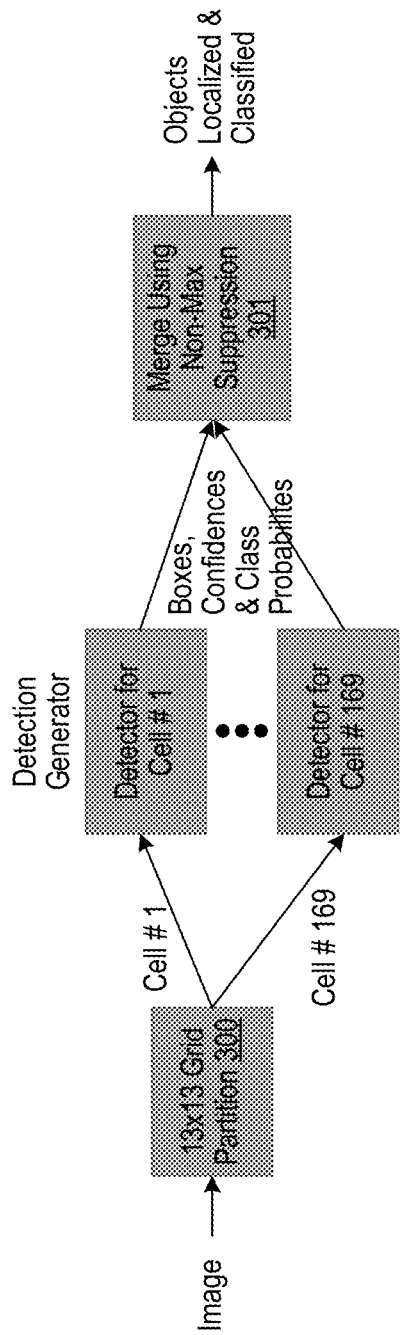
FIG. 3 illustrates a You Only Look Once (YOLO) architecture, in accordance with an example implementation.

In example implementations as described herein the object detector 120 is provided with a machine learning model that is trained in the background by model management 110. Model management 110 can be in the form of a cloud system that can be trained from feedback. Examples of machine learning models selected by object detector 120 are provided in FIGS. 2 and 3. The model management 110 collects the training set (e.g., images labeled with bounding boxes, the labelling being done by the object detector 120 or by manual editing using the Annotation Editor 140), and trains the model in the background to determine a model for detecting objects. Depending on the inventory, the corresponding model can be selected (e.g., for identifying pipes, boxes, etc. through techniques as illustrated in FIG. 2 and FIG. 3) by user selection through an interface of the device.

Inspection integrator 150 can integrate data from the device and annotations generated by the Object Detector 120 and optionally modified using the Annotation Editor 140, to perform reconstruction of a 2D/3D representation of the inspection objects by integrating multiple annotated frames, and to provide updates of the workflow to the workflow manager 160. Based on the inspection results as shown in FIG. 4, the workflow manager 160 can provide recommended areas/racks from the workflow to be inspected next. For example, if one rack is only 50% complete for inspection, such a rack can be provided as a recommendation for the one rack.

Workflow server 170 can provide the initial work flow for taking images of inventory based on the virtual map managed by the workflow server.

Example implementations can involve the detection of individual image frames in real-time. The purpose of object detection is to find, in a given image, all occurrences of objects of a specific class or classes so that the system can produce their bounding boxes, their classes, and associated likelihood. Example implementations involve an object detection algorithm that not only detects and count hundreds of tubular pipe objects in Red Blue Green (RBG) images accurately (as an example of tubular yard inventory counting), but can do so with low latency and in real time speed. Example implementations utilize convolutional object detectors that are trained to detect instances of specific object classes.

Example implementations involve convolutional object detectors that treat object detection as a regression problem which is solved using a single deep neural network. FIG. 2 illustrates a high-level architecture of a Single Shot Detector (SSD) type of object detector, where the Convolutional Neural Network (CNN) component 200 denotes a generic convolutional neural network that extracts features from the input image. These extracted features are fed to a deep neural network 201 that performs box regression and multinomial classification. Note that in FIG. 2, the separation into two boxes is only conceptual, but in the implementations both the CNN component 200 and the deep neural network 201 can be part of a single CNN network.

In another example implementation, the object detector can involve an implementation that treats object detection as a regression problem, as shown in FIG. 3. FIG. 3 illustrates a You Only Look Once (YOLO) architecture, in accordance with an example implementation.

In an example YOLO architecture, the input image is partitioned into a 13×13 grid 300 where all 169 grid cells are processed in parallel to detect bounding boxes, each associated with a confidence factor and involving class probabilities, which are then merged using non-max suppression 301. Each grid cell is responsible to detect objects whose center falls into the cell, using a custom CNN architecture with 2×53 layers such as Darknet-53. Note that the separation into 169 detection generator components is illustrated for conceptual purposes; in example implementations, the components can be part of a single CNN network.

As will be described herein, example implementations are configured to take individual frames and object detection and associate such data with the inspection areas.

FIG. 4 illustrates an example of a geolocated map of areas to be inspected in a workflow, in accordance with an example implementation. The context in which an inspection task is carried out is provided by the workflow data in the form of a virtual map of the inspection area, as illustrated in FIG. 4.

The virtual map in FIG. 4 shows the racks/areas to be inspected with their identification tags, such as "C2". This map, prepared in advance of the field inspection and downloaded from the workflow server onto a device such as a mobile device, provides geolocation for all racks/inspection areas in the form of coordinates (e.g., longitude, latitude) and their compass orientation.

To every image snapshot taken by the device in the example implementations, the GPS and IMU sensors provides the geolocation and direction of the camera, and can be displayed on the device as shown in FIG. 4 with the arrow labeled as "You Are Here". Using a simple geometric calculation, example implementations can determine the closest rack the camera is aiming at to be "C2". This simple application and another application, as will be described in the next subsection, where the geometric transform is modeled between two image snapshots, both require fairly accurate location and direction estimates.

To determine location accurately, real-time kinematic positioning systems (RTK GPU) facilitate implementations that can provide centimeter-level positioning accuracy.

To determine direction accurately, Micro-Electro-Mechanical Systems (MEMS)-based IMU sensors can be combined with additional magnetometers sensors. Although the location can be obtained by integrating IMU gyroscope velocity data over time, the presence of measurement noise and bias introduces integration drift. Bias can be corrected by properly calibrating the sensors. To minimize orientation errors due to temporal drift, example implementations first combine IMU sensors data with magnetometers measurements data which is drift-free. To estimate orientation, example implementations can assume measurement noises to be normally distributed to make it mathematically tractable. Any algorithm known to one of ordinary skill the art can be applied accordingly to produce the orientation estimates, such as extended Kalman filtering.

As a result, an image frame taken by the example implementations is not only annotated by bounding boxes and the class of objects detected in the frame, but also associated with which racks/inspection areas involve such objects.

Example implementations can utilize multiple snapshots taken of the same inspection area from different viewpoints, and combine the snapshots to reconstruct a high quality 2D or 3D virtual world of the inspection areas.

As illustrated in FIG. 4, based on the location and orientation data, the device can display the location of the device and which direction the camera is directed, including the corresponding inventory in the direction of the device. The virtual map is a geo-located map that can be provided by the workflow server 170 and updated by the device accordingly. Thus, through such example implementations, the system can tie the image and each frame to a particular subset of objects corresponding to a particular rack or other group of objects.

In an example implementation, as the group is defined with boundaries in the virtual map, the device can determine what frames correspond to what rack through processing by the inspection integrator 150. Information from multiple frames is associated with the corresponding location, orientation, depth, and meta data based on time stamp to determine what corresponding stack of inventory or objects correspond to the device.

To detect all objects in a given inspection area, example implementations described herein address the following issues. One snapshot cannot cover the entire area, so in order to achieve total coverage, example implementations take multiple overlapping snapshots. Further, objects are not equally visible in all directions the camera points at because of shading and occlusion.

To solve the first issue, example implementations take advantage of the panorama function of mobile devices or cameras to conduct image capture. If a panoramic picture of the entire inspection area can be captured, then example implementations can apply object detection to the panoramic picture. However, obtaining a panoramic picture of reasonable quality where objects can be detected can involve certain issues. Most notably, a video scan performed in the panoramic mode needs to be done perfectly, or else the pixel-level stitching would fail or at best produce many undesirable artifacts. This problem is exacerbated by object occlusion and shading.

Instead of doing pixel-level stitching followed by object detection, example implementations described herein are configured to conduct object detection on individual frames followed by "object-level stitching", in which the correspondence between objects detected in one frame and objects detected in another overlapping frame are identified. Thus, in contrast to pixel-level stitching which would require a video scan that produces a large number of images with small incremental changes, example implementations only need a few snapshots that cover the entire inspection area, as long as they overlap.

If the snapshots taken have associated location and direction information, such implementations can eliminate the need to constrain the scanning to be horizontal. In fact, between any pair of overlapping frames $F_1$ and $F_2$, there is enough data to geometrically project the objects detected in $F_1$ to what they would appear in $F_2$. This projection can be enhanced if additional calibration data is used to correct optical distortions.

Example implementations utilize the finding of a correspondence between objects detected in different frames based on the fact that the appearance of objects in one frame can be reliably predicted from their appearance in another frame, based only on the relative location and direction of the camera. In inventory counting situations, it is assumed that such objects do not move, and only the camera or mobile device moves in a manner in accordance with the desired implementation.

Figure 5:
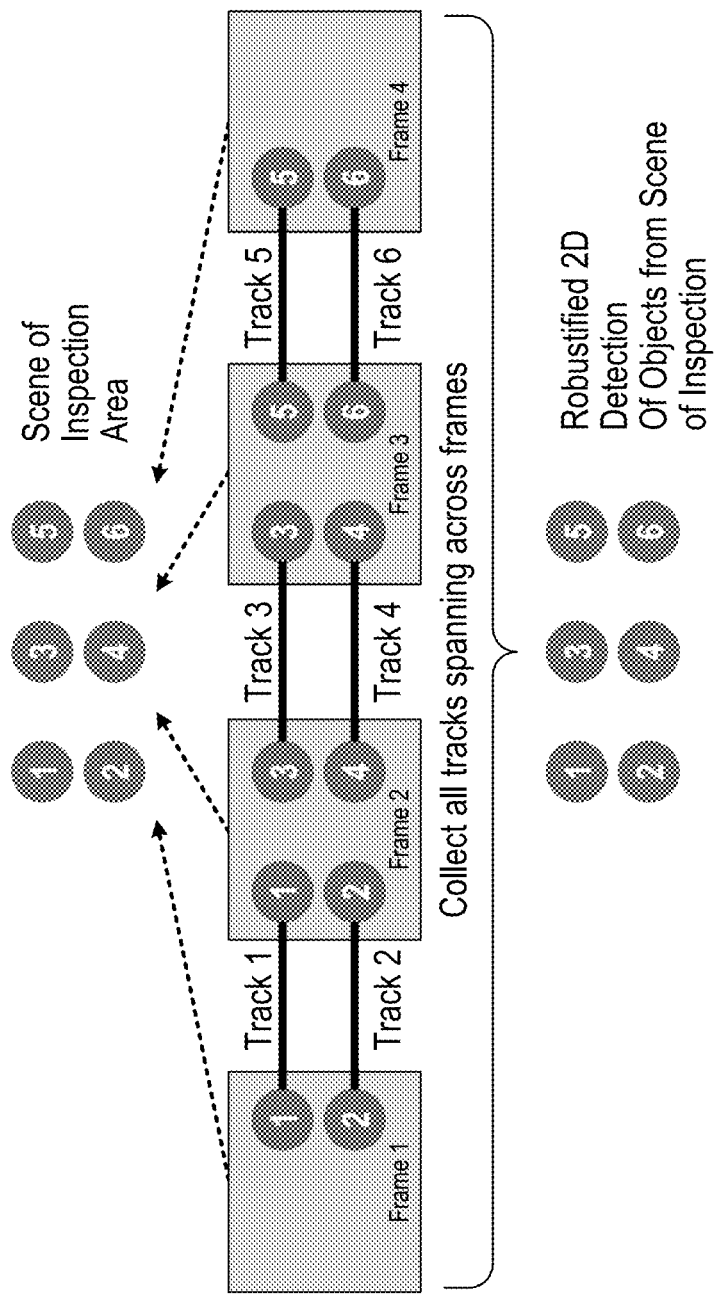
FIG. 5 illustrates an example tracking of objects across frames in which the tracks are used in 2D reconstruction.

FIG. 5 illustrates an example tracking of objects across frames in which the tracks are used in 2D reconstruction. To illustrate this idea of object-level stitching between frames, consider taking four overlapping snapshots of the inspection area from left to right, as depicted in FIG. 5. After objects are detected in each of the four example frames separately, example implementations find a bijective (one-to-one in laymen terms) object correspondence between all pairs of consecutive frames. Between Frame 1 and Frame 2, an edge is created between Object 1 in Frame 1 and Object 1 in Frame 2. This edge is labeled as Track 1. After carrying out similar analysis between Frame 2 and Frame 3, and between Frame 3 and Frame 4, a total of six tracks have been created. These edges, referred herein as tracks, represent the virtual objects in the 2D reconstruction of the inspection scene.

Figure 6:
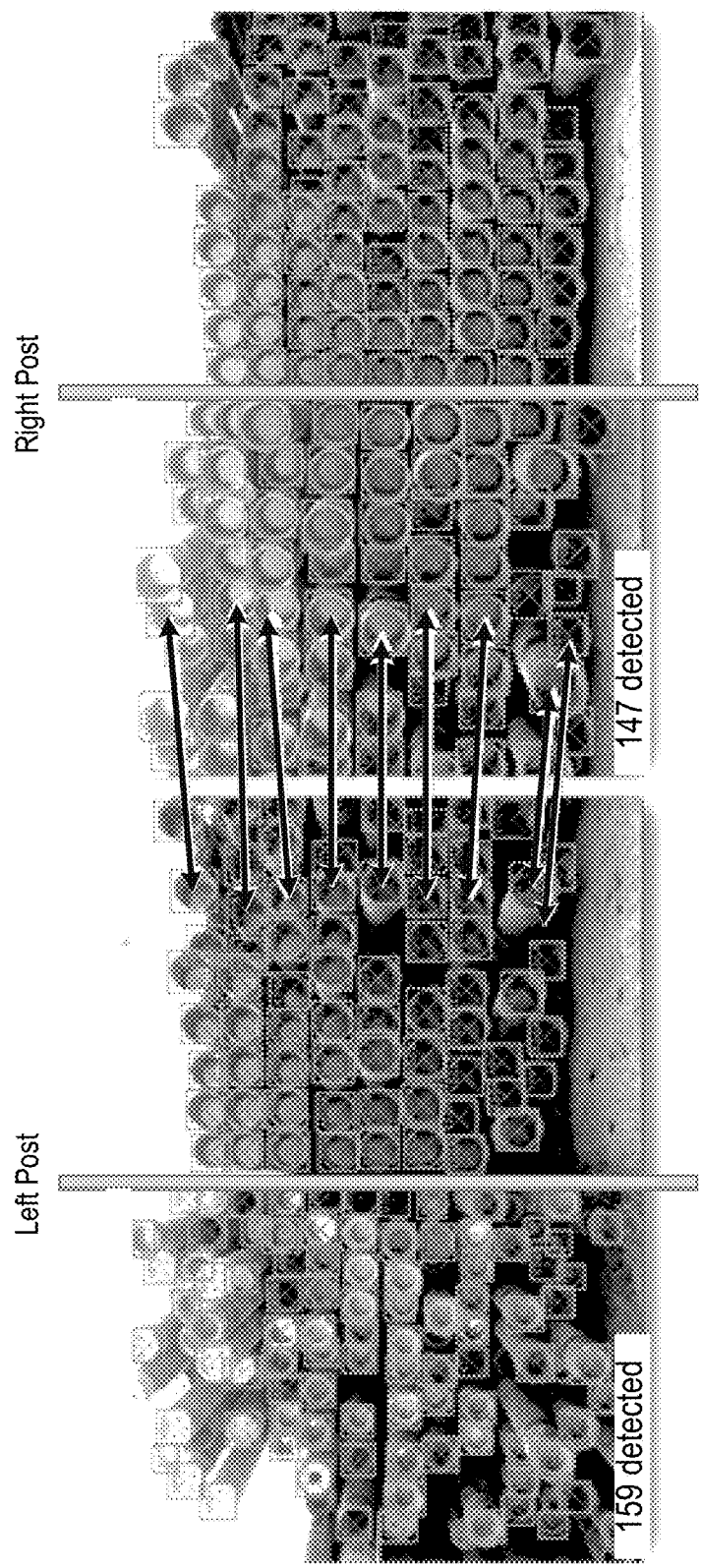
FIG. 6 illustrates the application of this method to a real problem of counting pipes between posts, in accordance with an example implementation.

FIG. 6 illustrates the application of this method to a real problem of counting pipes between posts, in accordance with an example implementation. In this scenario, to facilitate post detection, two snapshots are taken with each aiming straight at a post. The objects of interest are on the right of the post in the left image, and on the left of the post in the right image. Since the two images overlap, example implementations need to account for the duplicate objects. This is where the example implementations are tracking objects between the two frames applies. The line segments with double arrows in FIG. 6 represent tracks that join a vertical column of pipes in the left image to the corresponding vertical column of pipes in the right image.

More generally, the sequence of snapshots taken of the inspection area does not have to be linear nor follow any specific order, as long as they cover the entire inspection area. Strictly speaking they are not even required to overlap. However, the more overlaps there are, the more robust the result.

As illustrated in FIG. 6, the images can be captured by a handheld device such as a mobile device, and captures several image frames. In real time, the example implementations can then identify the objects in real time by applying bounding boxes on the detected objects as illustrated in FIG. 6, and determine a count based on the number of bounding boxes applied. Such example implementations can be annotated through annotation editor 140, which can be in the form of an interface on the screen of the device that allows the user to add or remove bounding boxes. Such implementations can be helpful if there is an object that is hidden due to poor lighting.

Figure 7A:
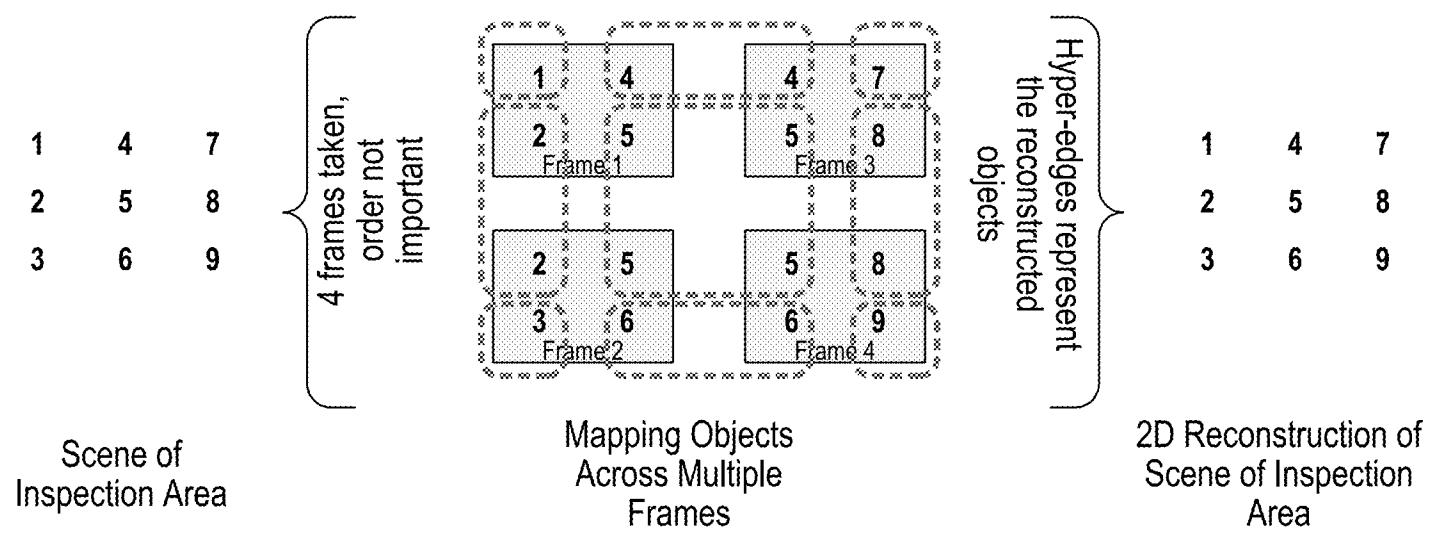

FIG. 7(a) illustrates an example of conducting 2D reconstruction involving snapshots that do not follow any specific order, in accordance with an example implementation.

In FIG. 7(a), four overlapping snapshots are taken that cover the entire inspection area, labeled Frame 1, Frame 2, Frame 3, Frame 4. Between any pair of frames, as before, we identify the bijective object correspondence. Consider the graph whose nodes represent all the objects in all the frames (the graph has 16 nodes in FIG. 7(a)). The four nodes labeled "5" are joined by an edge called a hyper-edge. These hyper-edges, shown in FIG. 7(a) as closed curves in dotted line, represent the virtual objects in the 2D reconstruction of the inspection scene. The 16-node graph is called a hypergraph.

Figure 7B:
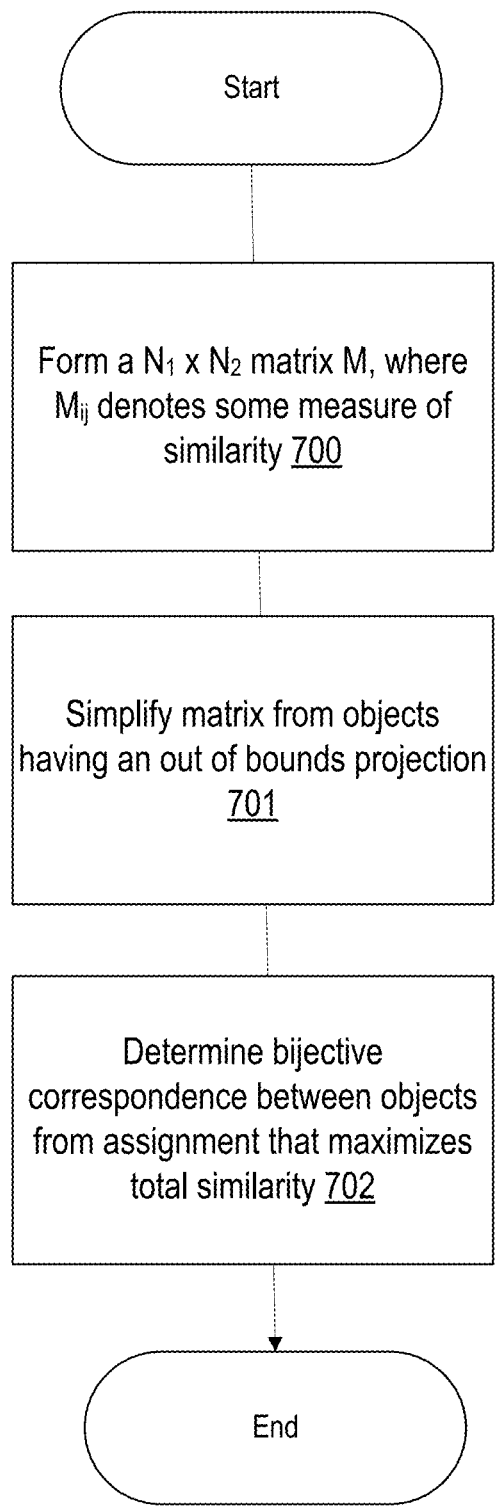
FIG. 7(b) illustrates an example flow for finding a bijective correspondence between objects detected in a pair of frames, in accordance with an example implementation.

FIG. 7(b) illustrates an example flow for finding a bijective correspondence between objects detected in a pair of frames, in accordance with an example implementation.

To find a bijective correspondence between objects detected in a pair of frames a flow is illustrated in FIG. 7(b). Given two frames $F_1$ and $F_2$, each with a collection of objects detected (e.g., in the form of bounding boxes and object classes), and each with the location and direction of the camera, an example algorithm that computes the best bijective correspondence between the two object collections is as follows. Let $N_1=|F_1|$ and $N_2=|F_2|$.

At 700, the flow forms a $N_1 \times N_2$ matrix M, where $M_{ij}$ denotes some measure of similarity. The similarity is determined between object j from $F_2$ and the projection of object i from $F_1$ onto $F_2$. In an example implementation, this projection uses only the camera location and direction for each frame to calculate the object's bounding box in $F_2$. The projection can be enhanced further if calibration data is utilized to correct optical distortions, to render the image of the object in $F_2$. In another example implementation, the similarity is determined between object i from $F_1$ and the projection of object i from $F_2$ onto $F_1$. Note that if the projection of an object goes out of bounds, the similarity can be automatically set to zero. For a pair of objects both of whose projections stay in bound, the two similarity measures can be averaged or otherwise addressed in accordance with the desired implementation.

At 701 the matrix is simplified from objects having an out of bounds projection. Specifically, matrix M is simplified by deleting those rows and columns that represent objects whose projection goes out of bounds. Example implementations can also be utilized in reducing the size of matrix M by deleting those rows and columns whose values (similarity measures) are all between a given threshold, in accordance with the desired implementation.

At 702 the bijective correspondence between objects is determined from an assignment that maximizes the total similarity. Let X be a Boolean matrix, of the same size as M, that represents an assignment of rows to columns. The best bijective correspondence between objects i and objects j is obtained by finding the optimal assignment X that maximizes the total similarity:

$$\sum_i \sum_j X_{ij} * M_{ij}$$

where X is subject to the constraint that each row is assigned to at most one column, and vice versa. Efficient algorithms exist (e.g., variants of the original Kuhn-Munkres algorithm) that can find the optimal assignment in time cubic in the number of objects. By maximizing the total similarity instead of the similarity between individual objects, computing objects correspondence is more robust, at the expense of increase complexity ($O(N^3)$ instead of $O(N^2)$).

Example implementations can also implement object similarity measures through the following. First, objects can be similar based on their location: given a bounding box $bb_1$ from frame $F_1$, a bounding box $bb_2$ from frame $F_2$, and the geometric transform T that projects $F_1$'s bounding boxes onto $F_2$, the similarity is evaluated between $T(bb_1)$ and $bb_2$. IOU (abbreviation for Intersection over Union) is a similarity measure commonly used in object detection in computer vision to measure how similar two bounding boxes A and B are:

$$IOU(A, B) = \frac{\text{Area}(A \cap B)}{\text{Area}(A \cup B)}$$

where $\cap$ denotes the region where the boxes overlap, and $\cup$ denotes the region for the union of the boxes.

IOU is a special case of what is known in statistics as the Jaccard similarity coefficient J defined over sets A and B as:

$$J(A, B) = \frac{\text{Size}(A \cap B)}{\text{Size}(A \cup B)}$$

In object detection, there can be a need to determine whether two bounding boxes A and B denote the same object, where for example A may be the ground truth bounding box that is the human-created object annotation result, and B the predicted bounding box that is the inference result of an object detection algorithm. The decision is often made by comparing IOU(A,B) with a given threshold α: A and B denote the same object if IOU(A,B)>α and are not the same object if otherwise. A threshold value of 0.5 is commonly used for α, but can be adjusted in accordance with a desired implementation.

The accuracy of similarity measure IOU(T($bb_1$), $bb_2$) hinges on how precise the geometric transform T can get, which itself depends on the accuracy of the sensor data and of the virtual map. If uncertainties are present, one way to address the uncertainties is to expand the size of bounding box T($bb_1$).

Second, objects similarity can be based on their visual appearance: given a Red Green Blue (RGB) image crop $cr_1$ from frame $F_1$, $cr_2$ from $F_2$, and the image transform T that maps image crops from $F_1$ onto $F_2$ (if needed, using image warping and correcting distortion if calibration data can be leveraged), example implementations evaluate visual similarity between T($cr_1$) and $cr_2$, in accordance with any desired implementation known to one of ordinary skill in the art, such as but not limited to Scale-invariant feature transform (SIFT) keypoints matching and histogram-based comparison methods.

Third, example implementations can combine both location similarity $S_1$ and appearance similarity $S_2$ by using a simple weighted linear combination:

$$\lambda_1 S_1 + \lambda_2 S_2 + \lambda_3 S_1 S_2$$

where the weights sum up to 1.

Finally, the similarity measures defined so far are asymmetrical, as they rely on transforming objects from $F_1$ onto $F_2$. One way to define a symmetrical similarity measure involves considering the measure based on the inverse transform and take the averaging of the two measures.

Figure 8:
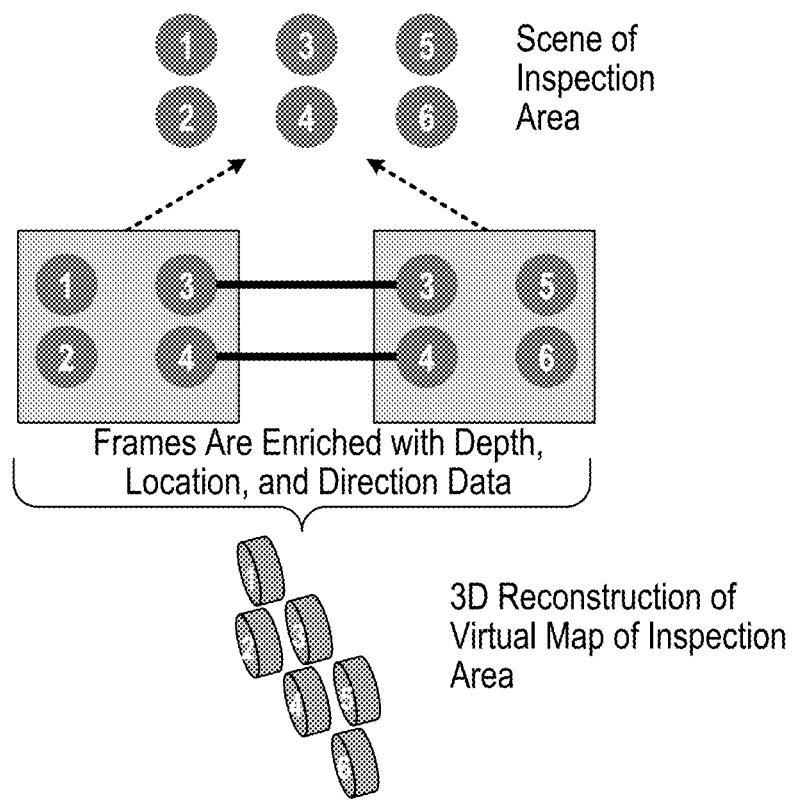
FIG. 8 illustrates an example of using depth data for 3D reconstruction, in accordance with an example implementation.

Example implementations can also conduct 3D reconstruction of the virtual world as follows. Example implementations leverage point clouds generated by LiDAR sensors to enrich the 2D annotations that result from object detection in a single with depth information. This in turn can be used to reconstruct a 3D representation of the objects from the inspection area, at least partially. However, the integration of multiple snapshots taken of the same area not only help improve the 3D reconstruction accuracy but make the reconstruction complete. FIG. 8 illustrates an example of using depth data for 3D reconstruction, in accordance with an example implementation. As illustrated in FIG. 8, the images corresponding to the scene of the inspection area are enriched by the depth, location, and direction data as well as having the objects associated with each other through the images based on the flow of FIGS. 7(a) and 7(b). As such, the 3D reconstruction of the virtual world can be reconstructed with the appropriate depth, location and direction determined for each object as illustrated in FIG. 8.

Example implementations can utilize virtual representations of the inspection areas, which can be reorganized to derive target outputs such as inventory counts.

The benefits of establishing a reconstructed virtual representation can include facilitating a more accurate and more complete account for the objects of interest in the inspection area, wherein the virtual representation can be freely reorganized to derive a wide variety of information that is useful to different applications.

Examples of outputs that can be derived can involve the following. From a complete and accurate collection of objects detected in the inspection area, inventory count can be derived as the collection size. Object annotations usually come with some notion of detection confidence or likelihood. A more conservative method for establishing counts is to perform a probabilistic inference on count to obtain an expected count, which can involve summing up all the probabilities in the collection.

Example implementations can also facilitate obtaining counts of objects of a certain size. From the bounding box data, a size surrogate can be computed for each object and used to filter the object collection. Further, there may be user interest in other information besides inventory count, such as the largest object size. Using the size surrogate as described herein, the example implementations can compare object sizes and determine the maximum size of an object.

From a 3D representation of the scene, example implementations can predict the appearance of the inspection area from any viewpoint by projecting the 3D solid model onto a plane and perform hidden curves elimination. This operation is already supported by state-of-the-art 3D rendering Application Programming Interfaces (APIs) and can be accelerated by graphics processor units (GPUs) in accordance with the desired implementation.

Example implementations described herein can be applied to any inventory management, which requires the position of the inventory. The bounding box approach including bounding box estimation and the combination of the estimation with individual inventory detection can be applied to any inventory recognition. Example implementations can fit to applications where the features of the inventory are extracted and where the cross section of the inventory is identical, but is not limited thereto. The examples inventory having identical or semi-identical cross-sections can be sewage pipes, lumber, metal bars, and utility poles. The location of the inventory fits for the large inventories where the position of the inventory is allocated with GPS. In the case of tubular inventory for oil and gas, the location can involve a mill, yard, and storage at well.

Figure 9:
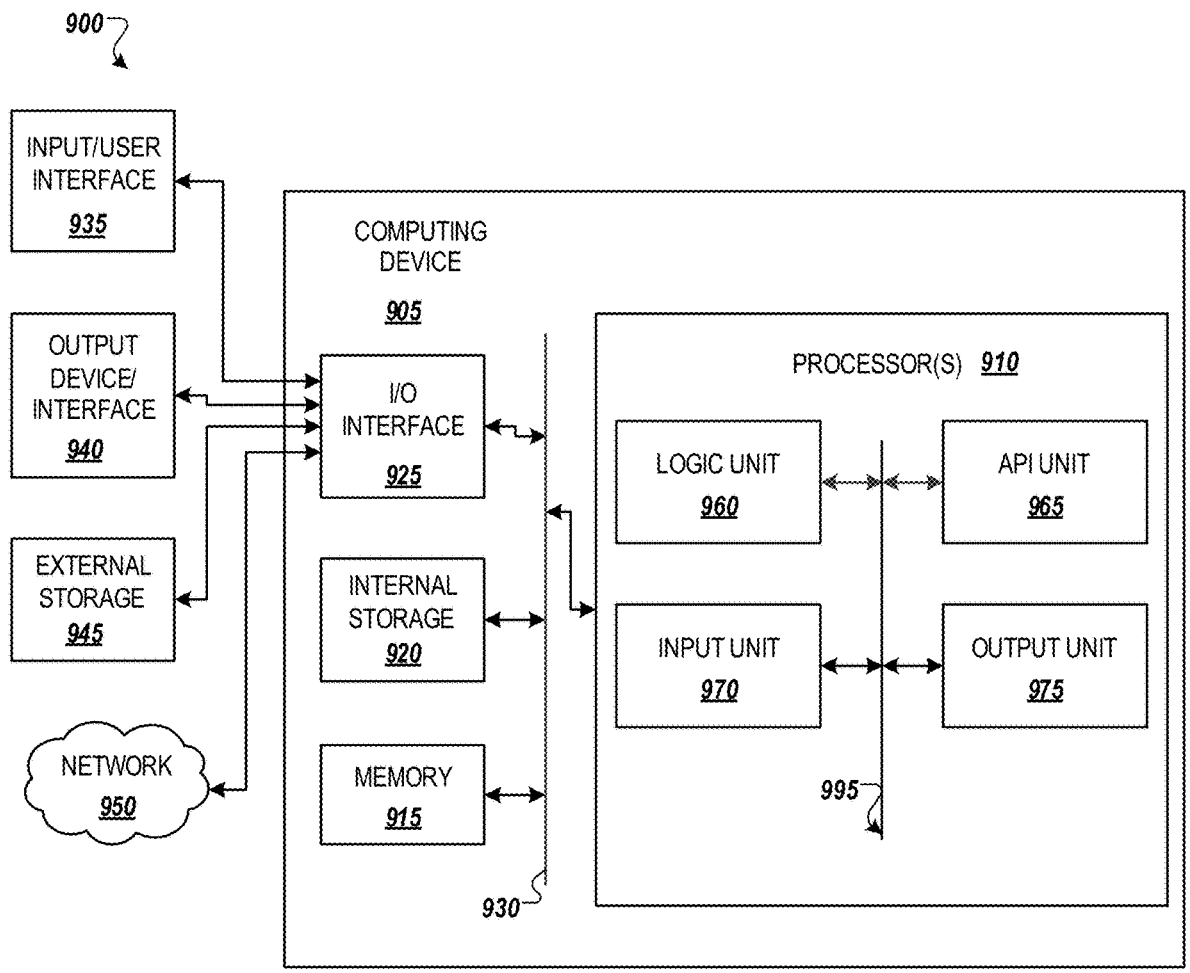
FIG. 9 illustrates an example computing environment with an example computer device suitable for use in some example implementations.

FIG. 9 illustrates an example computing environment with an example computer device suitable for use in some example implementations. Computer device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computer device 905. I/O interface 925 is also configured to receive images from cameras or provide images to projectors or displays, depending on the desired implementation.

Computer device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via I/O interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided. Processor(s) 910 can be in the form of hardware processors such as central processing units (CPUs) or in a combination of hardware and software processors, depending on the desired implementation. Further, processor(s) 910 can involve special purpose hardware processors, such as field programmable gate arrays (FPGAs), graphics processing units (GPUs), tensor units, or other special purpose hardware configured to facilitate the functions described herein or accelerate tensor arithmetic, in accordance with the desired implementation.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, input unit 970, output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide output based on the calculations described in example implementations.

In example implementations described herein, I/O interface 925 may also connect to various sensors when computing device 905 is operating as a mobile device or camera for taking images of inventory. Such sensors can include, for example, a camera 100, a GPS sensor 101, an IMU sensor 102 and a LiDAR sensor 103 as illustrated in FIG. 1. For example, processor(s) 910 can be configured to receive, through I/O interface 925, image frames from the camera, location data indicative of the location of the computing device 905 (e.g., in a form of GPS coordinates or latitude/longitude), orientation data of the computing device 905 through the IMU unit, and depth data from the LiDAR sensor. In example implementations, processor(s) 910 can synchronize the received data together by associating the data received with each image frame captured by the camera based on time stamp.

Processor(s) 910 can be configured to receive a plurality of image frames through camera 100, each of the plurality of image frames involving a subset of a plurality of objects as illustrated in FIGS. 5, 6, 7(*a*) and 8; identify each of the subset of the plurality of objects for each of the plurality of image frames through techniques as illustrated in FIGS. 2 and 3 and as illustrated in FIGS. 5, 6, 7(*a*) and 8; determine translations between the plurality of image frames based on identified objects of the subset of the objects that are identical as illustrated in FIGS. 5 to 7(*b*); and determine the plurality of objects for the translations as illustrated in FIG. 6. As described in example implementations as illustrated in FIGS. 5 to 8, the identifying of the objects and determining translations between objects based on similarity is conducted by using bounding boxes instead of pixel matching to facilitate real time identification and translation.

Processor(s) 910 can be configured to determine the translations based on a similarity and a size of each of the subset of the plurality of objects, and on projection estimates of objects in different frames based on sensor data, as illustrated in FIG. 7(*b*). In an example implementation, the size of each of the subset of the plurality of objects can be determined based on the size of the bounding box.

In example implementations in which computing device 905 involves a global positioning satellite (GPS) sensor and an inertial measurement unit (IMU) sensor; processor(s) 910 can be configured to receive location data from the GPS sensor and orientation data from the IMU sensor as associated with the each of the plurality of image frames (e.g., by matching timestamp of data measurements with the image frames), and the translations are determined based on the location and orientation of the device for the each of the plurality of image frames as determined from the location data and the orientation data as illustrated in FIGS. 4, 5 and 8. In such example implementations, as the location of the device is known, the inventory or objects in question can be identified from the virtual map based on the location and orientation of the device as illustrated in FIG. 4, whereupon the objects and their translations can be derived from the image frames in context with the location and orientation as illustrated in FIG. 8.

Processor(s) 910 can be configured to provide a virtual map indicating the plurality of objects and indicating a location and orientation of the device based on the location data and the orientation data as illustrated in FIG. 4, wherein the location data from the GPS and the orientation data from the IMU can tie the device 905 to the particular rack or set of objects in the inventory.

In example implementations involving a Light Detection and Ranging (LiDAR) sensor; processor(s) 910 is configured to receive depth data associated with each of the plurality of image frames from the LiDAR sensor, and determine a 3D reconstruction of the plurality of objects based on the depth data as illustrated in FIG. 8.

As illustrated in FIGS. 1 to 3, processor(s) 910 can be configured to identify the each of the subset of the plurality of objects for each of the plurality of image frames from a selection of a machine learning model configured to identify the plurality of objects as provided from Model Management and can include SSD based models as illustrated in FIG. 2 or YOLO models as illustrated in FIG. 3 in accordance with the desired implementation.

In example implementations, processor(s) 910 can be configured to provide an interface configured to provide annotations to identify missing objects from the plurality of objects, and train the selected machine learning model from the annotations as illustrated in annotation editor 140. Such an interface can be applied on FIG. 6, for example, wherein a touch screen interface can be utilized to add or remove bounding boxes on the screen in accordance with the desired implementation. Such feedback can then be provided to the model management 110 to train the model in the background in accordance with the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
  receiving, from a device comprising a camera, a global positioning satellite (GPS) sensor, and an inertial measurement unit (IMU) sensor; a plurality of image frames, each of the plurality of image frames comprising a subset of a plurality of objects;
  receiving location data from the GPS sensor and orientation data from the IMU sensor associated with the each of the plurality of image frames;
  identifying each of the subset of the plurality of objects for each of the plurality of image frames from utilization of bounding boxes;
  determining translations between the plurality of image frames based on identified objects of the subset of the objects that are identical from overlapping portions of the plurality of image frames and the bounding boxes; and determining the plurality of objects for the translations from overlapping portions of image frames to link continuous images with each other, wherein the translations are determined based on the location and orientation of the device for the each of the plurality of image frames as determined from the location data and the orientation data.

2. The method of claim 1, wherein the translations are determined based on a similarity and a size of each of the subset of the plurality of objects in the plurality of image frames and on projection estimates of objects in different frames based on sensor data.

3. The method of claim 1, further comprising receiving location data and orientation data of a device associated with the each of the plurality of image frames and wherein the translations are determined based on the location and orientation of the device for the each of the plurality of image frames.

4. The method of claim 3, further comprising providing a virtual map indicating the plurality of objects and indicating a location and orientation of the device based on the location data and the orientation data.

5. The method of claim 1, further comprising receiving depth data associated with each of the plurality of image frames, and determining a 3D reconstruction of the plurality of objects based on the depth data.

6. The method of claim 1, wherein the identifying each of the subset of the plurality of objects for each of the plurality of image frames is conducted in real time.

7. The method of claim 1, wherein the identifying the each of the subset of the plurality of objects for each of the plurality of image frames is conducted from a selection of a machine learning model configured to identify the plurality of objects.

8. The method of claim 7, further comprising providing an interface configured to provide annotations to identify missing objects from the plurality of objects, and training the selected machine learning model from the annotations.

9. A device, comprising:
a camera;
a global positioning satellite (GPS) sensor;
an inertial measurement unit (IMU) sensor; and
a processor, configured to:
receive a plurality of image frames from the camera, each of the plurality of image frames comprising a subset of a plurality of objects;
receive location data from the GPS sensor and orientation data from the IMU sensor associated with the each of the plurality of image frames;
identifying each of the subset of the plurality of objects for each of the plurality of image frames from utilization of bounding boxes;
determine translations between the plurality of image frames based on identified objects of the subset of the objects that are identical from overlapping portions of the plurality of image frames and the bounding boxes; and
determine the plurality of objects for the translations from overlapping portions of image frames to link continuous images with each other, wherein the translations are determined based on the location and orientation of the device for the each of the plurality of image frames as determined from the location data and the orientation data.

10. The device of claim 9, wherein the processor is configured to determine the translations based on a similarity and a size of each of the subset of the plurality of objects in the plurality of image frames, and on projection estimates of objects in different frames based on sensor data.

11. The device of claim 9, the processor configured to provide a virtual map indicating the plurality of objects and indicating a location and orientation of the device based on the location data and the orientation data.

12. The device of claim 9, further comprising:
a Light Detection and Ranging (LiDAR) sensor;
wherein the processor is configured to receive depth data associated with each of the plurality of image frames from the LiDAR sensor, and determine a 3D reconstruction of the plurality of objects based on the depth data.

13. The device of claim 9, wherein the processor is configured to identify each of the subset of the plurality of objects for each of the plurality of image frames in real time.

14. The device of claim 9, wherein the processor is configured to identify the each of the subset of the plurality of objects for each of the plurality of image frames from a selection of a machine learning model configured to identify the plurality of objects.

15. The device of claim 14, wherein the processor is further configured to provide an interface configured to provide annotations to identify missing objects from the plurality of objects, and train the selected machine learning model from the annotations.

16. A non-transitory computer readable medium, storing instructions for executing a process, the instructions comprising:
receiving, from a device comprising a camera, a global positioning satellite (GPS) sensor, and an inertial measurement unit (IMU) sensor; a plurality of image frames, each of the plurality of image frames comprising a subset of a plurality of objects;
receiving location data from the GPS sensor and orientation data from the IMU sensor associated with the each of the plurality of image frames;
identifying each of the subset of the plurality of objects for each of the plurality of image frames from utilization of bounding boxes;
determining translations between the plurality of image frames based on identified objects of the subset of the objects that are identical from overlapping portions of the plurality of image frames and the bounding boxes; and
determine the plurality of objects for the translations from overlapping portions of image frames to link continuous images with each other, wherein the translations are determined based on the location and orientation of the device for the each of the plurality of image frames as determined from the location data and the orientation data.

* * * * *